United States Patent
Pérez Cortés et al.

(10) Patent No.: US 12,373,979 B2
(45) Date of Patent: Jul. 29, 2025

(54) METHOD AND DEVICE FOR DETERMINING THE ORIENTATION OF A PHYSICAL OBJECT IN SPACE

(71) Applicant: INSTITUTO TECNOLÓGICO DE INFORMÁTICA (ITI), Valencia (ES)

(72) Inventors: Juan Carlos Pérez Cortés, Valencia (ES); Omar Del Tejo Catalá, Valencia (ES); Javier Pérez Soler, Castellón (ES); Jose Luis Guardiola García, Valencia (ES); Alberto J. Pérez Jiménez, Valencia (ES); David Millán Escrivá, Valencia (ES)

(73) Assignee: INSTITUTO TECNOLÓGICO DE INFORMÁTICA (ITI), Valencia (ES)

( * ) Notice: Subject to any disclaimer, the term of this patent is extended or adjusted under 35 U.S.C. 154(b) by 367 days.

(21) Appl. No.: 17/722,885

(22) Filed: Apr. 18, 2022

(65) Prior Publication Data

US 2022/0335643 A1 Oct. 20, 2022

(30) Foreign Application Priority Data

Apr. 19, 2021 (EP) .................................. 21382328

(51) Int. Cl.
*G06T 7/55* (2017.01)
*G06N 3/08* (2023.01)
(Continued)

(52) U.S. Cl.
CPC ................. *G06T 7/70* (2017.01); *G06N 3/08* (2013.01); *G06N 7/01* (2023.01); *G06N 20/00* (2019.01); *G06T 3/4007* (2013.01); *G06T 3/60* (2013.01); *G06T 7/292* (2017.01); *G06T 7/55* (2017.01); *G06T 7/60* (2013.01); *G06V 10/778* (2022.01);
(Continued)

(58) Field of Classification Search
None
See application file for complete search history.

(56) References Cited

U.S. PATENT DOCUMENTS 8,811,722 B2 8/2014 Perez Cortes et al.
11,544,841 B2 * 1/2023 Pérez Soler ............ G06T 19/00
(Continued)

FOREIGN PATENT DOCUMENTS

EP 2511653 B1 10/2012
EP 3418675 A1 * 12/2018 ............ B07C 5/366
WO 2020062053 A1 4/2020

OTHER PUBLICATIONS

European Search Report; priority document.

*Primary Examiner* — Tyler W. Sullivan
(74) *Attorney, Agent, or Firm* — Greer, Burns & Crain, Ltd.

(57) ABSTRACT

A method for determining the orientation of a physical object in space which determines the orientation of the object from the images captured by a set of cameras distributed around an image capture space. The method includes a set of steps which comprise: capturing multiple images of the physical object at the same time instant, machine learning modules determining the estimate of the orientation of the physical object for each of the cameras using the captured images, and a central processing unit determining the orientation of the physical object with respect to a global reference by combining the different estimated orientations.

15 Claims, 9 Drawing Sheets

(51) Int. Cl.
*G06N 7/01* (2023.01)
*G06N 20/00* (2019.01)
*G06T 3/4007* (2024.01)
*G06T 3/60* (2024.01)
*G06T 7/292* (2017.01)
*G06T 7/60* (2017.01)
*G06T 7/70* (2017.01)
*G06V 10/778* (2022.01)
*G06V 10/84* (2022.01)
*H04N 23/90* (2023.01)

(52) U.S. Cl.
CPC .............. *G06V 10/84* (2022.01); *H04N 23/90* (2023.01); *G06T 2207/20076* (2013.01); *G06T 2207/20081* (2013.01); *G06T 2207/20084* (2013.01); *G06T 2207/30244* (2013.01)

(56) References Cited

U.S. PATENT DOCUMENTS

| | | |
|---|---|---|
| 2019/0304134 A1 | 10/2019 | Mauchly et al. |
| 2020/0302160 A1 | 9/2020 | Hashimoto et al. |
| 2021/0233326 A1 | 7/2021 | Li et al. |
| 2022/0157161 A1* | 5/2022 | Tan .................... G06F 18/2415 |
| 2023/0282000 A1* | 9/2023 | Pang ....................... G01S 7/412 |
| | | 382/103 |

* cited by examiner

METHOD AND DEVICE FOR DETERMINING THE ORIENTATION OF A PHYSICAL OBJECT IN SPACE

CROSS-REFERENCES TO RELATED APPLICATIONS

This application claims the benefit of the European patent application No. 21382328.9 filed on Apr. 19, 2021, the entire disclosures of which are incorporated herein by way of reference.

FIELD OF THE INVENTION

The present invention relates to a method for determining the orientation of a physical object in space. The method determines the orientation of the object from the images captured by a set of cameras distributed around an image capture space.

The method is characterized by a set of steps which comprise: capturing multiple images of the physical object at the same time instant, machine learning modules determining the estimate of the orientation of the physical object for each of the cameras using the captured images, and a central processing unit determining the orientation of the physical object with respect to a global reference by combining the different estimated orientations.

BACKGROUND OF THE INVENTION

One of the fields of the art with the most intensive development is the field for reconstructing three-dimensional shapes of a physical object from photographic images which capture the object from different perspectives or at least allow information about the surface of the object to be inferred.

European patent no. EP2511653 is known and it describes the use of a plurality of image sensors distributed around an image capture space, and wherein the system is furthermore configured for allowing the free fall of the object through the capture space so that there is no support or securing element that conceals any part of the object.

The plurality of image sensors therefore captures a plurality of images which are sent to and subsequently processed in a central processing unit for reconstructing the shape of the object from the plurality of images corresponding to different perspectives of the object. This system may cause bottlenecks in the network due to the amount of information transmitted to the central unit.

The reconstruction of the shape of the object is followed by very useful subsequent applications such as the comparison between the computationally reconstructed model and the actual shape the object should have in order to assess possible manufacturing defects. To carry out the comparison, problems arise in the alignment of the reconstruction of the object with the reference model, such as the way of placing one element with respect to the other when the reconstruction of the object has been carried out in free fall and the orientation of the object is unknown.

The present invention solves the problems derived from the processing, reconstruction, and required comparison between the captured physical object and the reference model by means of the determination of the orientation of the physical object in space, wherein the invention uses a specific distributed processing system which solves the network bottleneck problem, increasing performance and minimizing network latency.

SUMMARY OF THE INVENTION

A first inventive aspect provides a method for determining the orientation of a physical object in space, wherein the method uses:
a plurality of cameras
wherein each camera comprises a sensor and an optic for focusing an image on the sensor according to an optical axis of the optic, and
wherein the cameras of the plurality of cameras are spatially distributed such that the optical axes of the cameras are oriented towards a capture region;
means for positioning the physical object in the capture region;
a plurality of distributed computing systems, each computing system in communication with at least one of the plurality of cameras; and each camera being in communication with at least one computing system of the plurality of computing systems;
one machine learning module for each camera, which can be run in the computing system associated with the camera, wherein the machine learning module is trained to determine the orientation of the physical object;
a central processing unit in communication with at least the plurality of distributed computing systems and with the means for positioning the physical object.

Throughout this document, an image sensor, or simply sensor when referring to the sensor of a camera, will be understood to mean an array sensor formed by pixels capable of capturing light that reaches it, generating an image that can be manipulated by a computational device.

In this description, a difference is made between an image sensor and a camera. The camera is a device intended for capturing images comprising an optic and an image sensor. The optic is adapted for focusing an image on the sensor according to an optical axis of the optic.

The method uses a plurality of cameras oriented towards a region in which the physical object is located in a specific instant. This region is identified as a capture region given that it is the region towards which the plurality of cameras is oriented for capturing at least part of the object when it is located in the region.

The spatial distribution of the cameras allows images of the object, which is located in the capture region, to be captured from different perspectives. According to a preferred example of the invention, the plurality of cameras is distributed in an equidistant manner in the space around the capture region, and more specifically according to a distribution on a spherical surface.

The means for positioning the physical object in the capture region are such that they place the physical object in the capture region in the moment in which each of the cameras captures an image simultaneously. Examples of these means are those that allow the object to fall freely such that the fall trajectory goes through the capture region at least in a given time instant or launching devices hurling the object up until it is also placed in the capture region at some point of its trajectory.

The cameras are linked to a computing system, wherein each computing system is configured for running one or more machine learning modules. All the cameras are linked to a computing system and each computing system is in communication with at least one camera. That is, several cameras may be in communication with the same computing system or each camera may be in communication with a specific computing system associated with the camera, but in any case, all the cameras are in communication with a computing system which is capable of running a machine learning module adapted for processing the image from the camera having associated therewith the computing system.

Each camera is associated with a machine learning module which is trained to determine the orientation of the physical object depending on the image captured by the camera and is run in a computing system. Each computing system is configured for receiving images from the camera or from the plurality of cameras which are in communication with the computing system.

Among the means used in the invention is a central processing unit which, according to one embodiment, can in turn consist of several microprocessors configuring a system, in communication with the means for positioning the physical object in the capture region and with the plurality of distributed computing systems. In particular, the central processing unit is capable of positioning the physical object in the capture region and determining the orientation of the physical object by means of the combination of the orientation estimates it receives from the distributed computing systems.

According to one embodiment, the central processing unit is also configured to activate the cameras so that they acquire an image of the object in the moment in which the physical object is ready to be captured in the capture region.

The method comprises the following steps:
instructing the means for positioning the physical object to position the physical object in the common capture region and instructing the plurality of cameras to capture, by means of each of the cameras, an image of the physical object at the same time instant;
for each camera, providing the image as an input to the machine learning module associated with the camera, determining the estimated orientation from the camera;
transmitting from the plurality of computing systems to the central processing unit at least the information determined by the machine learning models about the orientation of the physical object viewed from a plurality of cameras;
calculating, in the central processing unit, the angle determining the orientation of the physical object with respect to a global reference based on the combination of the different orientations estimated from the plurality of cameras.

The central processing unit can in turn comprise several processing units that are in communication, for example, with a unit specializing in camera orientation and shooting and another unit specializing in calculating the orientation of the physical object after the information has been received. Nevertheless, even these distributed implementation modes will likewise be identified as a central processing unit.

In these steps, a plurality of images is captured at the same time instant, one image per camera, such that images with a different perspective of the physical object when it is in the capture region are obtained. Nevertheless, the claimed system is robust as one or more cameras may not be capable of acquiring an image while the rest of the images would still be available and the method would be allowed to continue until the end, likewise providing an estimate of the orientation of the physical object. In this case, the system would act as if the cameras that have failed to capture the image were not there.

Each image captured by each of the cameras is transmitted to the computing system where the machine learning module associated with the camera is run. Each image is established as an input of the learning module associated with the camera which has captured the image and the machine learning module estimates the orientation of the physical object observed from the perspective of the camera.

Each machine learning module is trained to determine the estimated orientation of the physical object from the perspective of the camera which is associated with the machine learning module.

The orientation of a physical object in space can make use of various parameters unambiguously determining the orientation with respect to a pre-established reference system, for example, by means of azimuth and elevation angles and a rotation about an axis oriented by the preceding angles, or by means of the coordinates of the pre-established reference vectors associated with the physical object.

The reference taken on the physical object implies that the physical object has a known shape.

Once the machine learning modules have determined the estimate of the orientation of the physical object from the perspective of each camera, this information is transmitted from the distributed computing systems to the central processing unit in which the orientation of the physical object is determined in a precise manner.

The central processing unit uses the information of the estimated orientations received through the distributed computing systems to combine the estimated orientations, determining the orientation of the physical object according to a global reference system.

According to a preferred example, the global reference based on which the orientation of the physical object is estimated is previously determined in this manner, the orientation of each of the cameras with respect to this global reference system is defined.

According to one embodiment, the determination of the final orientation of the physical object based on the combination of the estimates made by the machine learning modules is carried out by means of a weighted mean of the estimated orientations.

The determination of the orientation of the physical object serves as a starting point for an alignment algorithm with a reference model for future comparison.

According to an embodiment of the invention, the orientation of the physical object determined by at least one machine learning module is an orientation vector or the azimuth and elevation angles and a third angle of rotation about an axis oriented by the preceding angles, a quaternion, or a rotation matrix, any of them being associated with a reference of the physical object.

The orientations estimated by the machine learning modules can be represented by means of different data structures. An example of a possible data structure for representing orientations is: an orientation vector, azimuth and elevation angles together with a third angle of rotation about an axis oriented by the preceding angles, a quaternion, a rotation matrix, etc.

Each of these orientation representation structures determines a specific way of working and performing calculations to determine the orientation of the physical object, and also of determining changes or rotations in the orientation of the object caused, for example, by a change in the reference system.

These structures are widely known and used for expressing a rotation or position of an object in space. The orientation of a physical object in a specific time instant is described with the same tools as it is defined as a rotation based on a reference system in space.

According to one embodiment, the orientation of the physical object determined by at least one machine learning module is a probability density function for each parameter determining the orientation.

According to this embodiment, after receiving the images captured by the cameras, the machine learning modules determine the orientation of the physical object in space by returning a probability density function for each parameter determining the orientation. The parameters will depend on the representation structure selected for representing the orientation of the physical object mentioned in the preceding example.

The probability density function describes the probability of the determined parameter taking a specific value.

According to one embodiment, the machine learning modules determine the orientation of the object by returning a discrete probability function for each parameter determining the orientation of the object. This function assigns probabilities to the different possible values, discrete values according to the preferred example, that the determined parameter can take, establishing the probability of the parameter taking each value.

According to one embodiment,
the plurality of machine learning modules has the same training to determine the orientation of the physical object;
the central processing unit has information about the orientation of each of the cameras with respect to a global reference; and
the central processing unit, before calculating the angle determining the global orientation of the physical object, transforms the estimated orientation from each camera from the local reference system of the camera to the global reference system.

According to this embodiment, the machine learning modules associated with each camera have the same training, i.e., each machine learning module estimates the orientation of the physical object from the local perspective of each of the cameras. In other words, each of the cameras obtains the estimated orientation of the object according to the perspective associated with a local coordinates system with respect to each of the cameras. In this case, it is only necessary to provide one trained machine learning module and to replicate the module as many times as the number of cameras there are in the system.

To determine the orientation of the physical object globally, a global reference pertaining to all the cameras must have been established. As mentioned above, an example could be the selection of one of the cameras as a reference point, or alternatively a reference system which takes two orthogonal coordinates with a specific orientation on the horizontal plane and a third vertical coordinate according to the direction of gravity.

According to this example, the central processing unit has information about the orientation and position of each of the cameras with respect to this specific global reference. In this manner, when the central processing unit receives the estimated local orientations, it transforms each of the local orientations of each camera into the global reference system. All the estimated orientations therefore have the same reference system, allowing the combination of the orientations estimated from the measurements obtained from each of the cameras.

The specific way in which the change in reference system is carried out depends on the selected orientation representation method.

According to one embodiment,
each machine learning module has a different training to determine the orientation of the physical object, particularly the machine learning module being trained to determine the orientation of the physical object viewed from the associated camera with respect to the global reference; and
the central processing unit determines the orientation of the physical object by weighting the plurality of orientation estimates transmitted from each machine learning module.

According to this embodiment, each machine learning module has a different training adapted to the specific orientation of the camera with which it is associated with respect to the global reference system. In this manner, each machine learning module is trained to determine the orientation estimated from the perspective of the camera associated therewith, providing only one orientation value in reference to the established global reference system.

Each machine learning module therefore returns the estimated orientation of the camera that is already adapted to the global reference. This information is transmitted to the central processing unit which, in this embodiment, no longer has to transform the orientations estimated in a local reference system into a global reference system in order to determine the global orientation of the object because all of them are determined with respect to the global reference common to all the cameras. This much simpler post-processing involves a more complex training phase since each camera must be trained specifically to provide the orientation in the global reference system when it has the specific perspective giving the orientation thereof in the moment of capture. To determine the global orientation, the central processing unit weights the received estimates determined for each of the cameras, obtaining a precise orientation of the object.

In a particular example, the central processing unit computes the simple mean of the estimates received through each camera in order to calculate the global orientation. According to another example, the global orientation can be determined by weighting the local estimates according to the probability density function associated with each parameter of each estimated orientation.

According to one embodiment,
at least one machine learning module is adapted for providing in its output, for each parameter $\alpha_k$ determining the orientation of the physical object, a plurality $K_k$ of output ports $S_l$, $l=1 \ldots K_k$ discretizing the range of values of the parameter $\alpha_k$;
during training, for each discrete value of each parameter $\alpha_k$ determining the orientation of the physical object, the following steps are carried out:
establishing, in the output ports $S_l$ corresponding to the set of the discrete values of parameter $\alpha_k$ which determine the orientation of the physical object (O), a positive value between 0 and 1 in the output ports $S_l$, and the value 0 in the rest of the output ports;
orienting the physical object according to the discrete parameters $\alpha_k$;
providing an image to the input of the machine learning module according to how the physical object with the orientation established by discrete parameters $\alpha_k$ is observed;
configuring the machine learning module so that, given the input established in step c), the module provides the output established in step a).

The orientations estimated by the machine learning modules can be represented by means of different data structures. Depending on the selected data structure, different parameters determining the orientation of the physical object will be obtained.

According to this embodiment, at least one machine learning module returns a plurality of outputs for each parameter determining the orientation of the object. The plurality of outputs for each parameter results from discretizing the parameter, and each output port determines a possible discrete value of the parameter. For example, if only the azimuth angle and the elevation angle together with a third angle of rotation about an axis oriented by the preceding angles is used, the system would use three parameters, and each of the parameters can in turn, for example, be discretized in each of its definition domains, for example, into 256 possible discrete values equally distributed in the domain. That is, the azimuth angle would be discretized in the range of [0, 2π), the elevation angle would be discretized in the range of [−π, π], and the angle of rotation would be discretized in the range of [0, 2π).

To train the machine learning module, the values for each output port which determines a discrete value of the parameter are defined for each parameter determining the orientation of the object. Therefore, there is established for each parameter a set of output ports determining a specific discrete value with a positive value, preferably 1, and for the rest of the output ports of the parameter representing the rest of the possible discrete values, a value 0. The value preferably being 1 allows the output to be normalized and to constitute a probability density function once the machine learning module is trained.

The set of discrete values of the output ports defined with a positive value for each parameter therefore determine the orientation of the object corresponding to an also discrete set of orientations if, for each parameter, only one output port has a positive value and the rest have a value of zero. To train the module, the physical object is oriented according to the parameters, making the orientation of the object coincide with the orientation defined by those discrete values of the output ports with a positive value.

In one embodiment, in step a), given an orientation of the physical object (O) and the corresponding value of parameter $\alpha_k$, the values of the output ports with a positive value or with the value 0 are determined according to the following sub-steps:
determining a Gaussian function having, as a mean, the value of parameter $\alpha_k$, and a pre-established variance;
generating a histogram of the Gaussian function with the points of discretization of parameter $\alpha_k$ and assigning the value of the corresponding histogram to each output port.

This way of training in which the object only adopts orientations that can be represented by parameters in which, among the plurality of output ports only one port is not null and the rest have the value of zero, is not unique, and intermediate positions with respect to those established by the discrete set of output ports can be represented with the same output port configuration. The way of proceeding is as follows:

Given a parameter defined in a range, the range is discretized in the set of values represented by each of the ports, for example, with uniform discretization. In a specific orientation, the parameter value can take a value other than any of the discrete values. In this case, a Gaussian function is defined, the function having as a mean the value of the parameter and as a variance a pre-established value preferably equal to the inverse number of the number of cells of the discretization to the second power multiplied by the difference between the maximum and minimum values of the range of the value of the parameter. Other embodiments can choose values which, by means of experimentation, prove to be suitable for a specific application depending on the physical object. A probability density function is then constructed from this Gaussian function and a histogram is generated from the probability density function making use of the discretization of the parameter. The values of the histogram for each discrete value are the values imposed on each corresponding output port.

According to one embodiment, before generating the histogram, an upsampling is carried out on the discrete values of the Gaussian function in the discretization of parameter $\alpha_k$ and the values of the histogram are calculated in the points of discretization of parameter $\alpha_k$ taking the values interpolated on the upsampling values.

Although this way of training allows the imposition of intermediate values with respect to those determined by the discrete values imposed by the discretization, it is also possible to establish in usage conditions, not in training conditions, the value estimated at the output depending on the outputs of the plurality of output ports. For this purpose, a method of interpolating or alternatively fitting the output values by means of a continuous curve is carried out. This curve has a maximum which is considered as the output value and the maximum will be at a point of the domain that does not have to coincide with one of the points of discretization of the parameter. The location of the parameter domain with which the maximum of the now continuous curve corresponds will be the value of the parameter which determines the orientation.

According to one embodiment, the interpolation is by means of splines, preferably of order 3.

The curve is constructed by means of splines (interpolation by means of polynomials defined piecewise and with continuity in the interface of the derivatives thereof). According to another preferred embodiment, the points on which the spline is constructed are those obtained after a process of upsampling the discrete output values obtained in the output ports, upsampling being understood as a process of expansion and filtering mainly by means of interpolation intended for estimating the sample that would be attained if sampling were to be performed with a higher resolution on a continuous signal. In a preferred example, the splines are of order 3 with the ends of the curve being free or the second derivative at the ends being null.

An image in accordance with the orientation of the preceding object is provided as an input to the machine learning module and the module is configured so that, given the input, it returns the set of output ports with the established values for each parameter defining the orientation. Configuring the machine learning module so that it provides the pre-established output in view of the input image must be interpreted as the modification of the internal weights establishing the behavior of the machine learning module so that it provides the pre-established output. Machine learning modules that are based on algorithms such as convolutional neural networks or on genetic algorithms require techniques for modifying such weights specific for each algorithm, even if the training techniques are known in the state of the art.

According to one embodiment, the image of step c) is generated according to the following steps:
generating a numerical model representing the shape of the physical object;

orienting the numerical model according to the orientation established by discrete parameters $\alpha_k$.

Numerical model will be interpreted as any model for representing a physical object constructed with computational means. The numerical model is instantiated in the computational means making use of specific data structures at least with information about the shape of the object. The same numerical model can incorporate additional information, for example, the attributes of the object, such as the surface texture, or drawings that can be represented on the surface modifying its outer appearance.

The numerical model is identified as a model for representing the shape of the physical object because the numerical model is a theoretical shape of the physical object, with theoretical shape being interpreted as the shape describing the shape of the object by means of mathematical entities.

Examples of information about the shape of the object are: specific structures defining all or part of the outer surface of the object, specific points located on the outer surface of the represented object, information about the way in which one or more of the preceding elements are connected, if there is such connection, etc.

According to this embodiment, instead of using as an input of the machine learning module images of the physical object oriented according to the set of discrete values of the output ports defined with a positive value for each parameter, the numerical model representing at least the shape of the physical object is oriented according to the parameters, making the orientation of the numerical model coincide with the orientation defined by those discrete values of the output ports with a positive value.

The advantage of this way of proceeding is that the orientation of the object simulated by means of a numerical model can be adjusted accurately for a number of different orientations, for example, with lighting conditions very close to the actual conditions for capturing the image at a very high speed given that it can be automated. The number of possible orientations for the set of discrete values of the output may be extremely large. This can be shown simply in the example of two parameters discretized with 256 points each which would give rise to $256^2=65,536$ different orientations that are different from one another, requiring at least one training image.

According to one embodiment, the central processing unit, before calculating the angle determining the global orientation of the physical object, eliminates anomalous estimates of the plurality of orientation estimates transmitted from each machine learning module.

According to this embodiment, in order to improve the precision in the determination of the orientation of the physical object in space, the central processing unit can eliminate estimated orientations that can be considered poor estimates because they are not precise enough or because they come from cameras that are rather unreliable.

According to a preferred example, two acceptance criteria can be established for accepting the orientation estimates transmitted by the machine learning modules: a confidence criterion and a distance criterion.

According to one embodiment, the confidence criterion is applied as an acceptance criterion. According to another embodiment, the distance criterion is applied as an acceptance criterion. According to another embodiment, there is a need to overcome both the confidence criterion and the distance criterion.

The acceptance of an estimate is established as a confidence criterion if and only if the typical deviation of the probability density function is less than a specific pre-established value (for each parameter determining the orientation of the physical object).

The acceptance of a subset of estimates such that there is no distance between a measurement of the orientation and the mean of the measurement which exceeds a certain threshold is established as a distance criterion.

According to the example that is preferred as a result of its optimal behavior, only estimates that meet the two criteria will be considered by the central processing unit to determine the global orientation of the object in the last step.

According to one embodiment, at least one machine learning module comprises a neural network configured for determining the estimated orientation of the physical object from the camera associated with the machine learning module.

According to a preferred example, the machine learning module is furthermore trained to determine the movement of the physical object and comprises outputs with parameters determining the movement.

According to this preferred example, the movement of the physical object determined by at least one machine learning module is represented by means of a set of movement parameters, for example three parameters (x, y, z) determining the movement of the object with respect to a reference system in space.

According to this example, the output of the machine learning module comprises a set of parameters corresponding to the movement of the physical object, and in the training step, the machine learning module is trained establishing in the output ports corresponding to the parameters determining the movement of the object the value of the movement of the object. In the determination of the movement of the object, the variability of the values of the movement parameters is also taken into account.

According to one embodiment, the machine learning module is furthermore trained to detect the surface appearance of the physical object.

According to one embodiment, a numerical model which, in addition to shape, represents the surface appearance of the physical object is generated.

According to this embodiment, the numerical model generated to train the machine learning module can incorporate additional information besides the shape of the physical object, for example attributes of the object such as the appearance of the outer surface of the physical object.

In this manner, when the machine learning module is trained, the numerical model which is used for training the orientation of the object comprises the characteristics of the external appearance, the machine learning module learning to detect not only the shape of the object but also the surface characteristics thereof.

This is relevant for cases in which the physical object being worked with is symmetrical. In these cases, the machine learning module is capable of detecting the surface of the object in addition to the shape, being capable of distinguishing which part of the object is observed from the associated camera, when it may not be possible to know which part is being observed by detecting only the shape due to the symmetries of the object.

Another object of this invention relates to the device for determining the orientation of a physical object in space, as well as a product comprising a computer program comprising instructions such that, when run on a computer, the program causes the computer to carry out a method according to steps a) to d) on the described system and according to any of the described embodiments.

BRIEF DESCRIPTION OF THE DRAWINGS

These and other features and advantages of the invention will become more apparent from the following detailed description of a preferred embodiment given solely by way of non-limiting illustrative example in reference to the attached figures.

FIG. 6A shows the distribution of the error of an estimator assigning to each new image the rotation of its closest training image. FIG. 6B shows the distribution of the error of the estimator trained and evaluated with the object of the preceding example.

FIG. 9A shows the distribution of the error of an estimator like the one described for FIG. 6A using the object of the preceding example. FIG. 9B shows the distribution of the error of the estimator trained and evaluated with the object of the preceding example.

DETAILED DESCRIPTION OF THE PREFERRED EMBODIMENTS

According to the first inventive aspect, the present invention relates to a method which allows determining the orientation of a physical object (O) in space, specifically in a capture region (Reg).

The preferred embodiment of the invention uses a plurality of N cameras ($C_i$) with i=1 ... N, the index which allows identifying each of the cameras.

Figure 1:
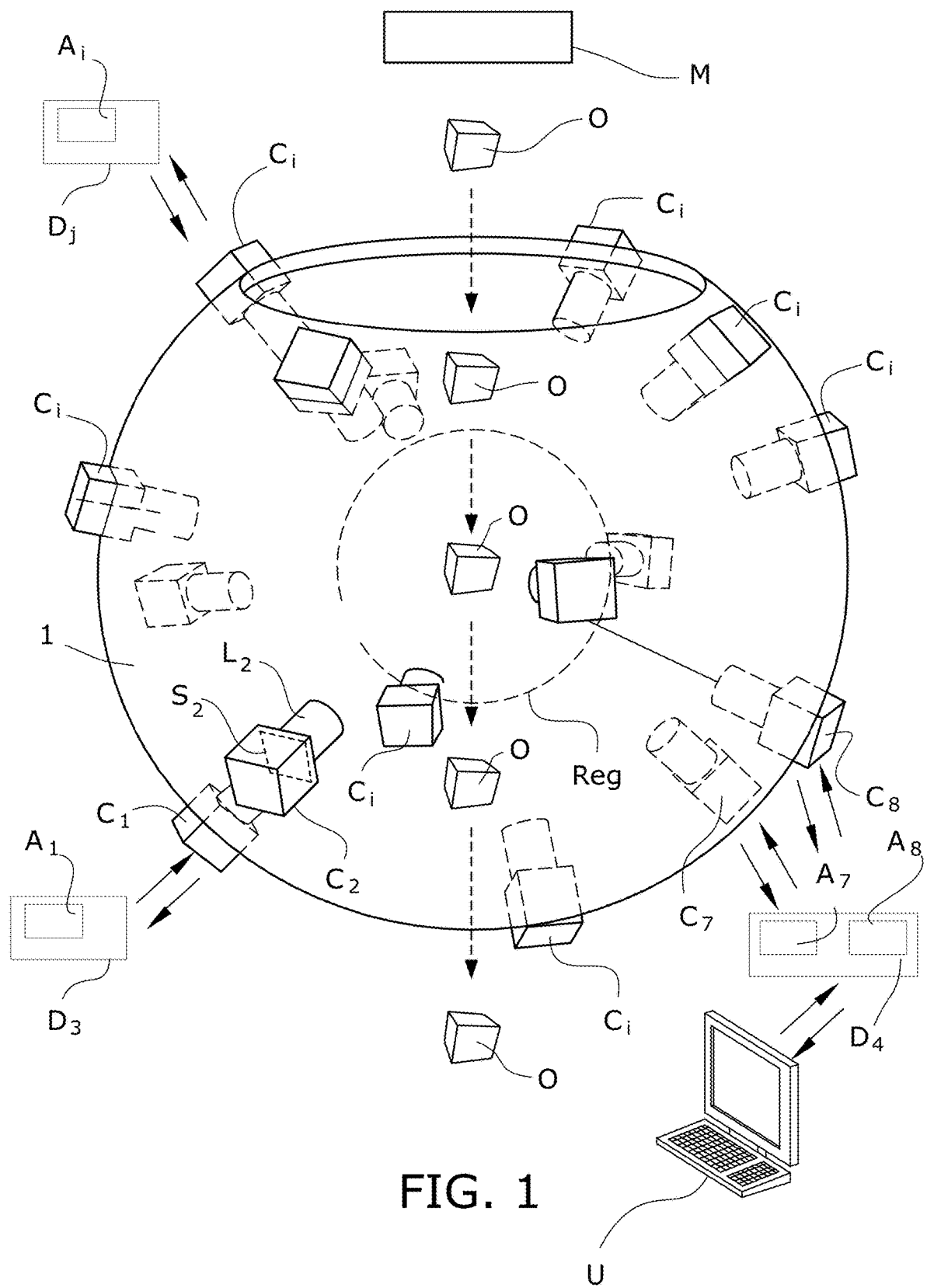
FIG. 1 schematically shows an embodiment of a device for capturing images and of the subsequent processing of the images which allows a specific mode of the invention to be carried out.

FIG. 1 shows a structure (1) having a spherical configuration on which each of the N cameras ($C_i$) is installed where, in this embodiment, an equidistant distribution between cameras has been chosen. Each camera ($C_i$) is fixed to the structure (1) oriented towards the inside thereof such that the optical axis of the plurality of cameras ($C_i$) is oriented towards a capture region (Reg). In this embodiment, the capture region (Reg) is located in the center of the structure (1) having a spherical configuration and is within the depth of field of each of the cameras ($C_i$).

Figure 2:
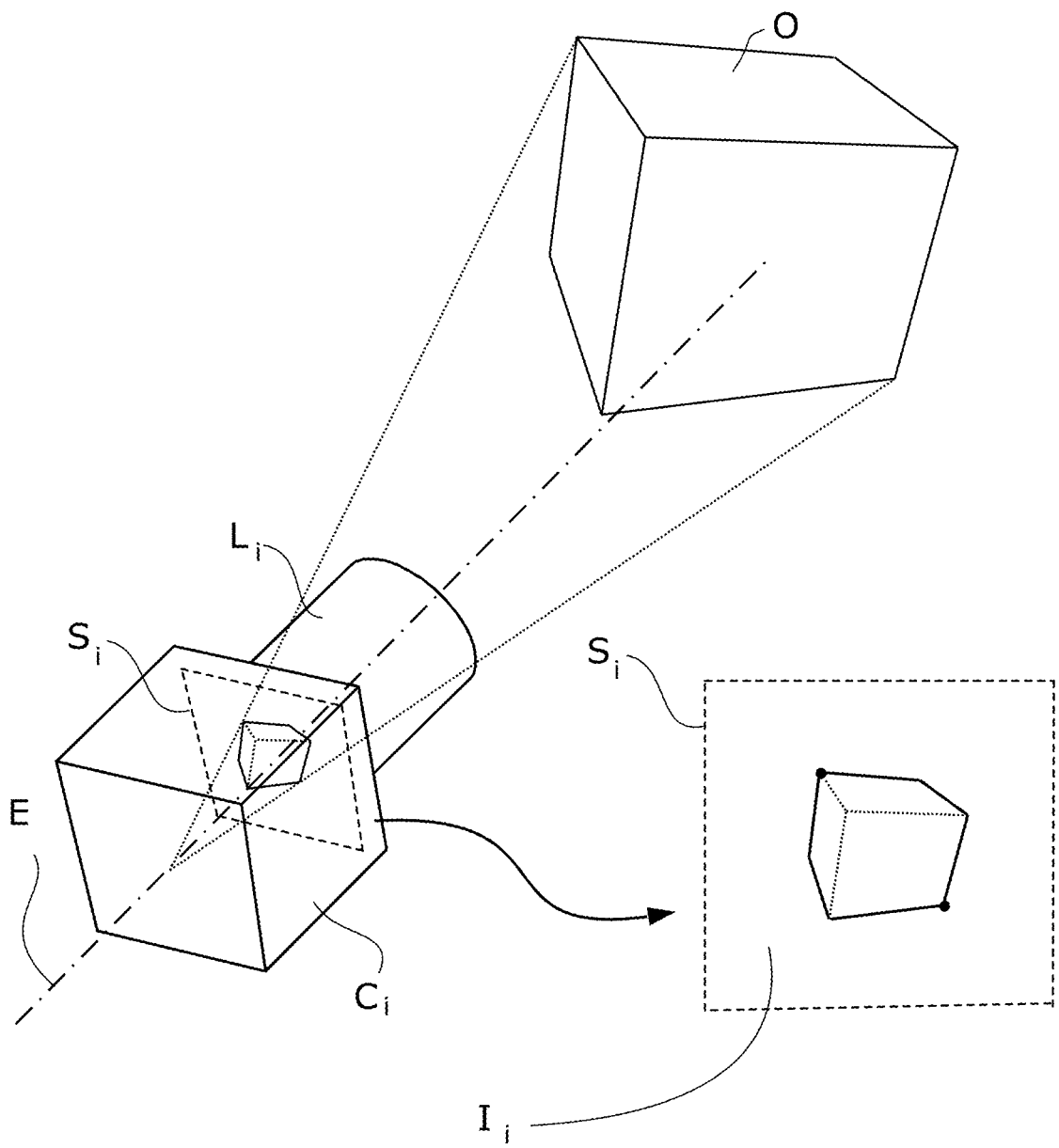
FIG. 2 schematically shows a detail of one of the cameras, the parameters, and the most relevant components, as well as the obtained image shown as a separate detail.

FIG. 2 shows how each of the cameras ($C_i$) comprises a sensor ($S_i$) and an optic ($L_i$) for focusing an image ($I_i$) on the sensor ($S_i$) according to an optical axis (E) of the optic ($L_i$). In this embodiment, the sensor ($S_i$) is an array sensor formed by light-sensitive pixels such that the optic ($L_i$) focuses the image ($I_i$) which is captured and can be subsequently processed by a computing system ($D_j$) on the surface of the sensor ($S_i$).

According to the preferred example of the invention shown in FIG. 1, the device used in this method comprises means for positioning (M) the physical object (O) in the capture region (Reg). In this embodiment, the structure (1) has an opening in the upper part and an opening in the lower part such that the physical object (O) can travel through both openings in free fall, going through the capture region (Reg). The means for positioning (M) the physical object (O) in the capture region (Reg) at least comprise elements that allow the physical object (O) to suitably fall so as to follow this trajectory going through the capture region (Reg). The advantage of means of this type for positioning (M) the physical object (O) in the capture region (Reg) by means of free fall is that none of the outer surfaces of the physical object (O) will be covered by a support, such that the cameras ($C_i$) surrounding the capture region (Reg) can visually access all the surfaces.

Other alternative means allowing the physical object (O) to be located in the capture region (Reg) is a launcher which is located in the lower part of the structure (1) and launches the physical object (O) until it is located in the capture region (Reg). The advantage of this second option is that the point at which the object changes direction along its trajectory (from moving up to moving down) is in the capture region (Reg), achieving a zero ascent speed in an instant, preventing blurred images, or is slightly above the capture region, allowing the physical object (O) to be located twice in the capture region (Reg) with a low passage speed with respect to the capture speed of the camera.

According to the preferred example of the invention, the device used comprises a plurality of distributed computing systems ($D_j$), each of them in communication with at least one of the cameras ($C_i$) such that the distributed computing systems ($D_j$) can receive the images ($I_i$) captured by the cameras ($C_i$). Each of the cameras ($C_i$) is in communication with at least one computing system ($D_j$). In this manner, the device may comprise as many computing systems ($D_j$) as the number of cameras ($C_i$) available or may comprise a number of computing systems ($D_j$) smaller than the number of cameras ($C_i$), such that several cameras ($C_i$) can be in communication with one and the same computing system ($D_j$).

The device further comprises a machine learning module ($A_i$) for each of the cameras ($C_i$). The machine learning modules ($A_i$) are run in the distributed computing systems ($D_j$), such that each machine learning module ($A_i$) is run in the computing system ($D_j$) in communication with the camera ($C_i$) with which the module is associated. According to the preferred example of the invention, the machine learning modules ($A_i$) are trained to determine the orientation of an object (O) in space.

The example shown in FIG. 1 shows only two computing units, D3 and D4, from among the plurality of computing units, wherein computing unit D3 is in charge of running the machine learning module A1 and computing unit D4 is in charge of running two machine learning modules, A7 and A8. The rest of the computing units (Dj) and of the machine learning modules (Ai), although present, are not graphically shown so as to not overload FIG. 1 with too much information.

According to the preferred example of the invention, the device used comprises a central processing unit (U) in communication with at least the plurality of distributed computing systems ($D_j$) j=1 . . . M and with the means for positioning (M) the physical object (O) such that it can activate the means for positioning (M) the physical object (O) placing it in the capture region (Reg) and, when the object is inside same, activate all the cameras ($C_i$) simultaneously, with i=1 . . . N, providing a plurality of images ($I_i$), i.e., up to N images if they are all valid, of the physical object (O) from different perspectives and orientation.

Each computing system ($D_j$) is a physical unit configured for receiving images ($I_i$), processing the images ($I_i$), and sending relevant information at least about the orientation of the physical object (O) to the central processing unit (U).

According to this configuration of the device, the network bandwidth used to send information to the central processing unit (U) is reduced because instead of sending the images ($I_i$) to be processed by a single processor after they have been captured by the cameras ($C_i$), the images ($I_i$) are first processed in the computing systems ($D_j$) close to each camera ($C_i$) and only the relevant information about the orientation is sent to the central processing unit (U), which requires a significantly smaller bandwidth, preventing bottlenecks.

Comparing the size of an image, represented by a three-dimensional matrix of integers, with the parameters determining the orientation which could be only three actual values (azimuth and elevation angles and angle of rotation) is sufficient.

Once the physical object (O) is positioned in the capture region (Reg) and captured by the plurality of cameras ($C_i$), each computing system ($D_j$) receives the images ($I_i$) captured by the cameras ($C_i$) in communication with the computing system ($D_j$).

If a specific camera $C_i$ for a specific i captures the entire physical object (O), the image $I_i$ generated by the camera $C_i$ will have a set of pixels corresponding to the object (O) and, in its surroundings, a set of pixels showing the surrounding space of the object (O). Although the example is preferred, the invention still works when one or more cameras capture the object partially.

To achieve capturing the object completely, the physical object (O) must be located in the capture region (Reg) in the moment of capture and the depth of field of each of the cameras $C_i$ must be sufficient to cover the entire visible part of the physical object (O).

After receiving the images ($I_i$), each image ($I_i$) is established as an input of the machine learning module ($A_i$) associated with the camera ($C_i$) from which each image ($I_i$) originates. Then, each machine learning module ($A_i$) determines the estimated orientation of the physical object (O) observed from the associated camera ($C_i$).

Once the estimated orientations have been calculated by each machine learning module ($A_i$), the information is sent from the plurality of computing systems ($D_j$) to the central processing unit (U) where the orientation of the physical object (O) with respect to a global reference is determined by combining the estimates of the orientation from the plurality of cameras ($C_i$), obtaining a more precise orientation of the object (O).

Figure 3:
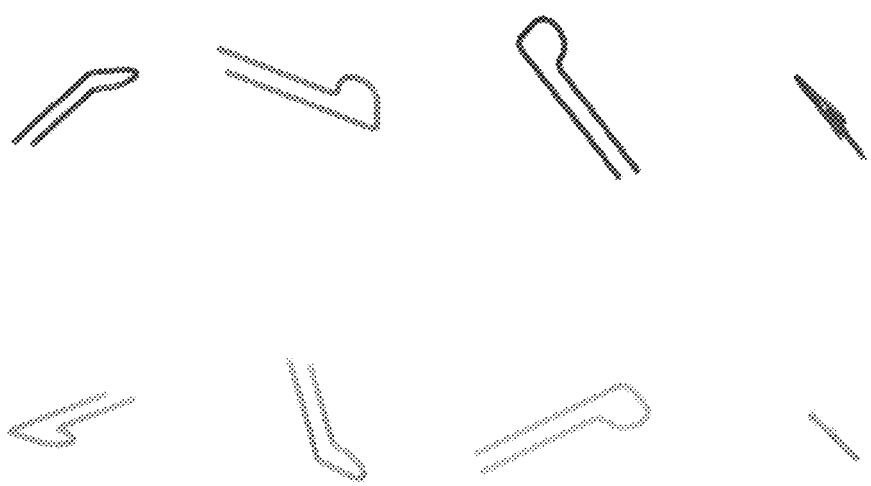
FIG. 3 shows an example of a sequence of images, each of them being in a different orientation, in the generation of images of a non-symmetrical object (a clip with a specific shape) for training and testing a machine learning module.

FIG. 3 shows an example of a sequence of images of a clip which are generated from the rendering of a numerical model projected according to different perspectives for training and testing a machine learning module ($A_i$).

The clip is a non-symmetrical object, and therefore, in principle, the shape of the object detected by each camera will be different. Therefore, the machine learning module ($A_i$) is capable of determining the orientation of the object by simply detecting the shape.

According to this embodiment, a single camera will be used to estimate the position of an object (O), in this case the clip. According to this particular example, the orientation of the physical object (O) determined by at least one machine learning module ($A_i$) is a vector of rotation in a quaternion format.

According to this example, the machine learning module ($A_i$) comprises a neural network which is trained to determine the estimated orientation of the physical object (O) from the camera.

To train the network of the machine learning module (Ai), quaternions defining different possible orientations of the object (O) will be randomly generated and images of the object (O) corresponding to the orientations will then be generated. The generated images are therefore established as an input of the machine learning module (Ai) and the machine learning module (Ai) is configured, given an image, for returning as an output the orientation in the form of a 4-dimensional vector corresponding to the quaternion.

According to this example, the images shown in FIG. 3 are generated to train the machine learning module ($A_i$), 6 of them being used to train the network, 1 as validation, and the last one being used for testing and for obtaining the following results.

After training the network and estimating the orientation of the clip in the last image, the following errors between the estimate and the actual value of the orientation of the object in the last image are obtained:

Mean=29.92°

Median=23.81°

Figure 4:
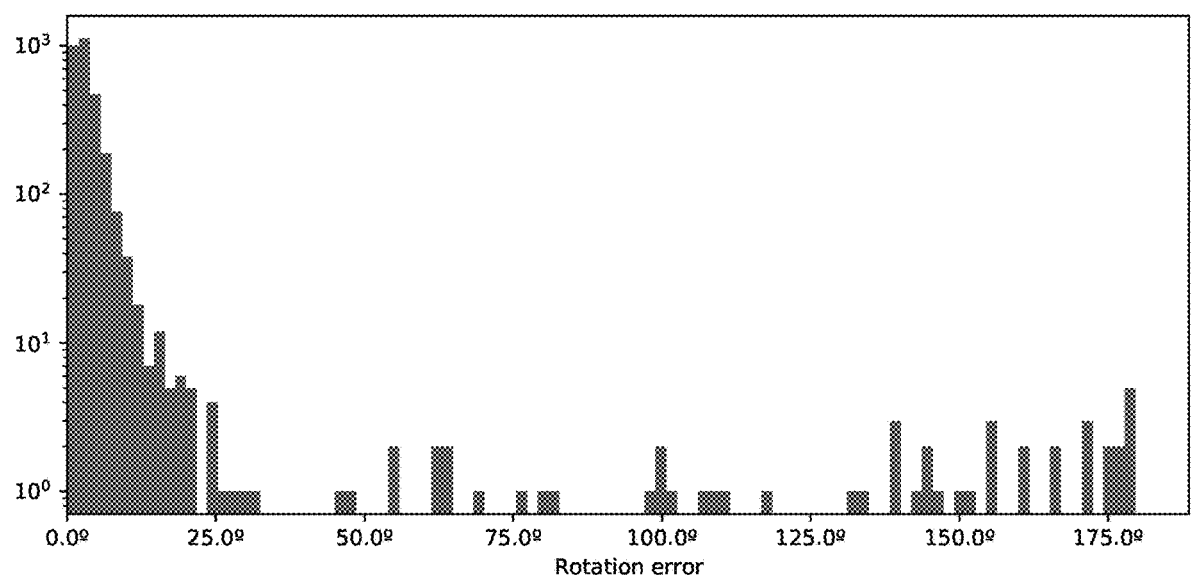
FIG. 4 shows the graph of the distribution of the error at a specific angle having as domain [0, 180°] for the preceding example using a camera.

FIG. 4 shows the obtained distribution of the angle-related error. The estimate of the orientation is of poor quality because the image used for testing the network has the clip in a complicated orientation and gives rise to problems in the single-camera identification of the object and orientation.

Figure 5:
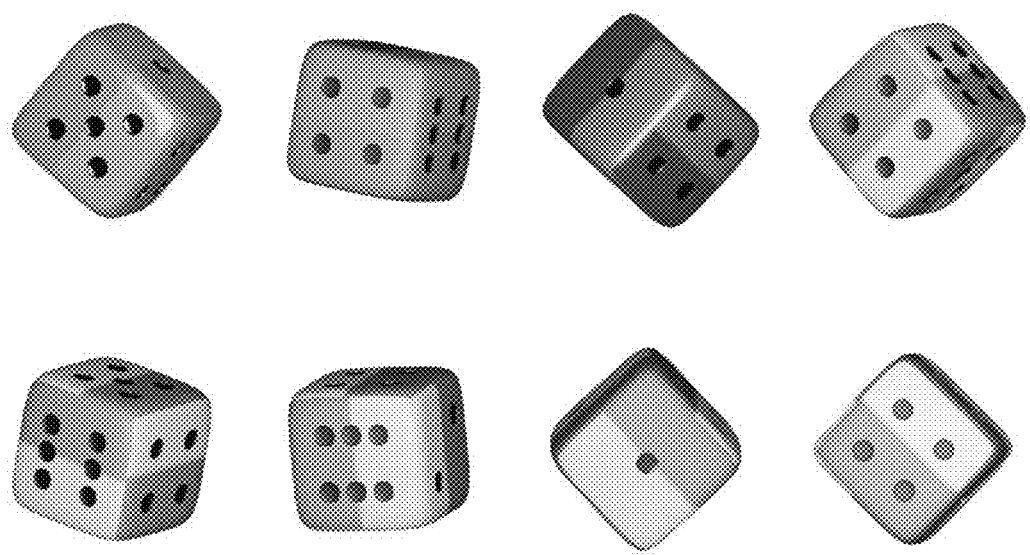
FIG. 5 shows an example of a sequence of images in the generation of images of a symmetrical object (a die) for training and testing a machine learning module. Though shown in grey, the data also have different colors on each of the faces thereof.

FIG. 5 shows an example of a sequence of images of a die which are generated for training and testing a machine learning module ($A_i$).

In this example, the die is a symmetrical object and several images of the object captured from different perspectives may coincide with one another. Therefore, in these cases, the machine learning module ($A_i$) furthermore is trained to detect the surface appearance of the physical object (O).

Like in the preceding example, a single camera will be used in this example to estimate the position of an object (O), in this case the die. According to this particular example, the orientation of the physical object (O) determined by at least one machine learning module ($A_i$) is a vector of rotation in quaternion format.

According to this example, the machine learning module ($A_i$) comprises a neural network which is trained to determine the estimated orientation of the physical object (O) from the camera.

To train the network of the machine learning module ($A_i$), quaternions defining different possible orientations of the object (O) will be randomly generated and images of the object (O) corresponding to the orientations will then be generated. The generated images are therefore established as an input of the machine learning module ($A_i$) and the machine learning module ($A_i$) is configured, given an image, for returning as an output the orientation in the form of a 4-dimensional vector corresponding to the quaternion.

According to this example, the images shown in FIG. 5 are generated to train the machine learning module ($A_i$), 6 of them being used to train the network, 1 as validation, and the last one being used for testing, and the following results are obtained.

After training the network and estimating the orientation of the die in the last image, the following angle-related errors between the estimate and the actual value of the orientation of the object in the last image are obtained:
Mean=13.14°
Median=10.72°

Figure 6A:
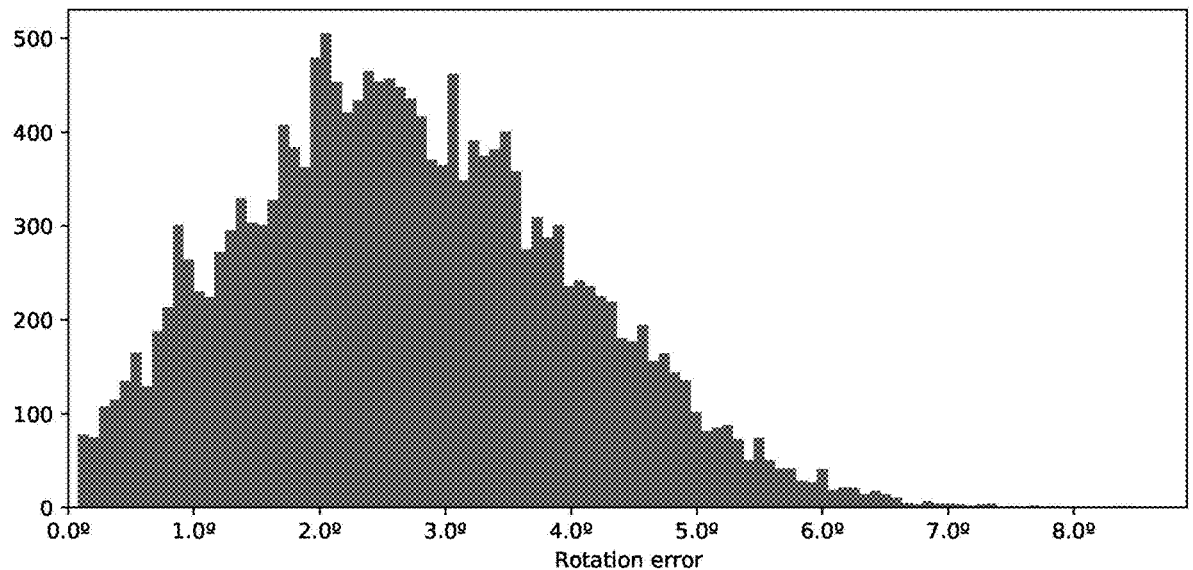
FIGS. 6A and 6B show the graphs of the distribution of the error of the angle determined for the preceding example using a single camera, measured in degrees.
Figure 6B:
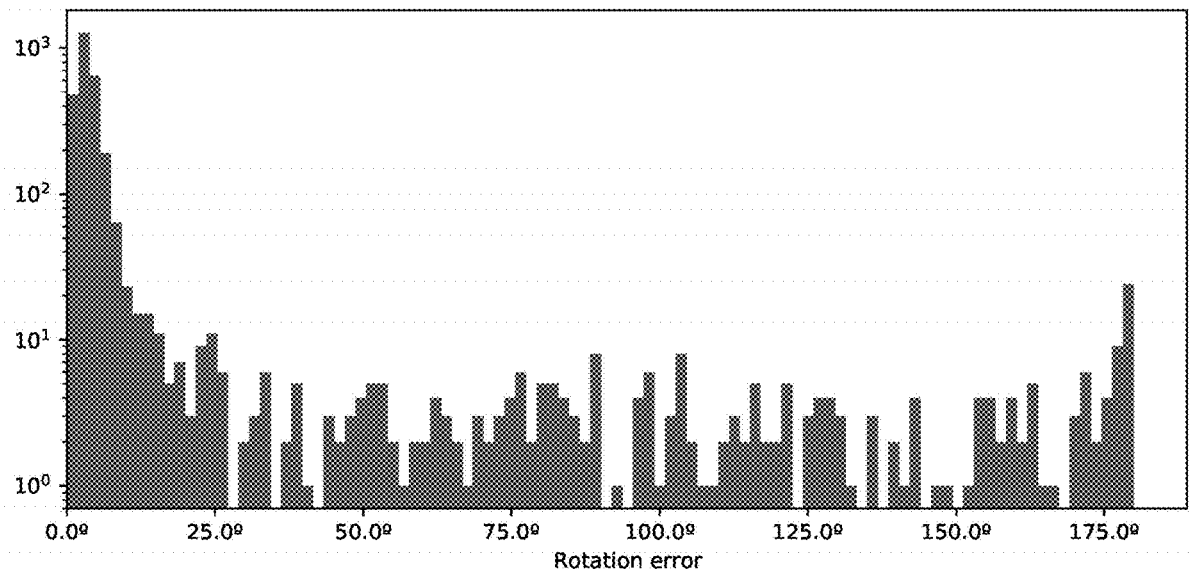

FIGS. 6A and 6B show the obtained distribution of the angle-related error. FIG. 6A shows the distribution of the best anticipated error, while FIG. 6B shows the distribution obtained from the test performed with the last image. Due to the use of a single camera to determine the orientation, a large error can be obtained in the estimate.

Figure 7:
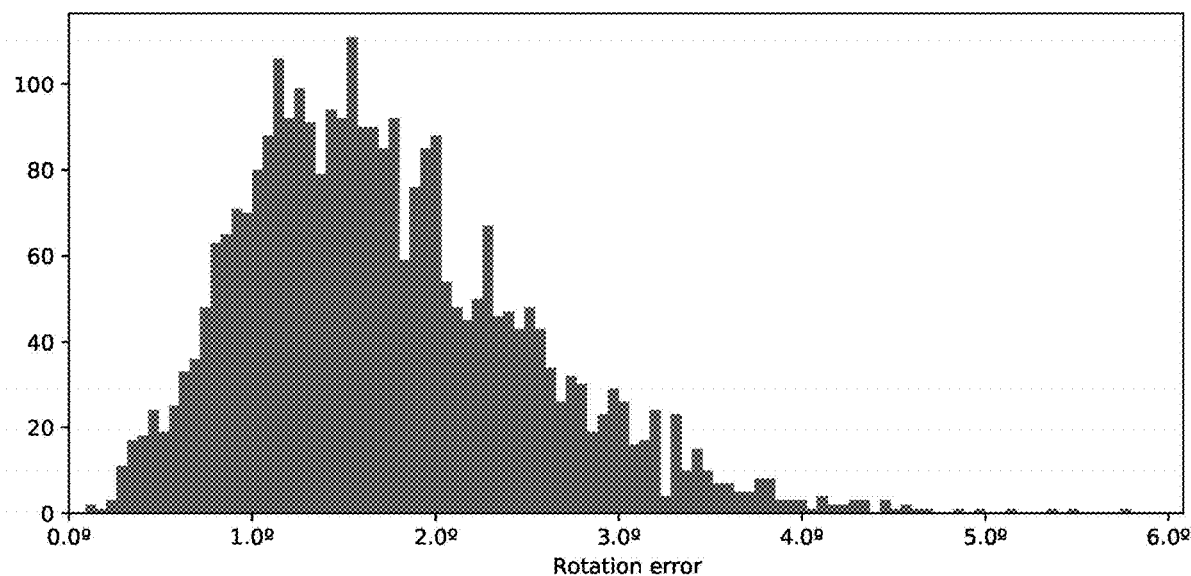
FIG. 7 shows the graph of the distribution of the error of the estimator trained and evaluated with the object of the preceding example using six cameras.

FIG. 7 shows the graph of the distribution of the angle-related error obtained after estimating the orientation of a die with six cameras based on the training performed in the preceding example.

According to this example, the network of a machine learning module ($A_i$) is trained as specified above and replicated so that there is one module ($A_i$) for each camera ($C_i$).

To determine the orientation of the physical object (O) in a global and specific manner, a global reference pertaining to all the cameras must be established. According to this particular example, camera 1 is established as a reference point.

According to this example, the central processing unit (U) has information about the orientation and position of each of the cameras ($C_i$) with respect to this specific global reference. In this manner, when the central processing unit (U) receives the estimated local orientations, it corrects each of the local orientations of each camera ($C_i$) to transform the local orientation into an orientation according to the global reference system of all the cameras ($C_i$). All the estimated orientations therefore have the same reference point, allowing them to be combined for determining the global orientation of the object (O) in a precise manner.

The angle-related mean error determined by each of the views between the estimate and the actual orientation of the object in this test example is as follows:
Mean error of camera 1=12.71°
Mean error of camera 2=12.8°
Mean error of camera 3=14°
Mean error of camera 4=12.4°
Mean error of camera 5=14.8°
Mean error of camera 6=12.1°

To reduce this error in the estimate and to determine the orientation of the object (O) in a precise manner, information about the estimates of orientations for each camera of the computing systems ($D_j$) is sent to the central processing unit (U) in which the estimates are combined to determine the global orientation of the object (O).

According to this example, information about the orientation is represented with quaternions, so the combination of the information is performed by means of the mean of the angles suggested by the estimated quaternions. To compute the mean of the quaternions, the sign of those quaternions with a negative sign must be changed in order to be able to compute the mean.

After combining the estimates, the following angle-related errors between the combination of estimates and the actual value of the orientation of the object in the test image are obtained:
Mean=9.57°
Median=6.34°

As can be seen, a more precise estimate of the orientation is obtained with the use of a larger number of cameras as compared to the use of a single camera like in the preceding example.

As can be seen, the mean and median are distanced slightly from the same value. Therefore and due to factors such as object symmetries, in this example, the median and the standard deviation of the distances of the estimates and the mean orientation thereof are calculated so that the estimate is resistant to poor estimates made by cameras that are rather unreliable. The estimates to be eliminated depending on whether they exceed a threshold defined for the mean and another threshold defined for the deviation are then determined.

By eliminating anomalous quaternions, the following angle-related errors between the combination of estimates and the actual orientation are obtained.
Mean=5.47°
Median=5.08°

As can be seen, a more precise estimate of the orientation is obtained with the elimination of anomalous quaternions.

FIG. 7 shows the distribution of the angle-related error obtained from the test that is performed.

Figure 8:
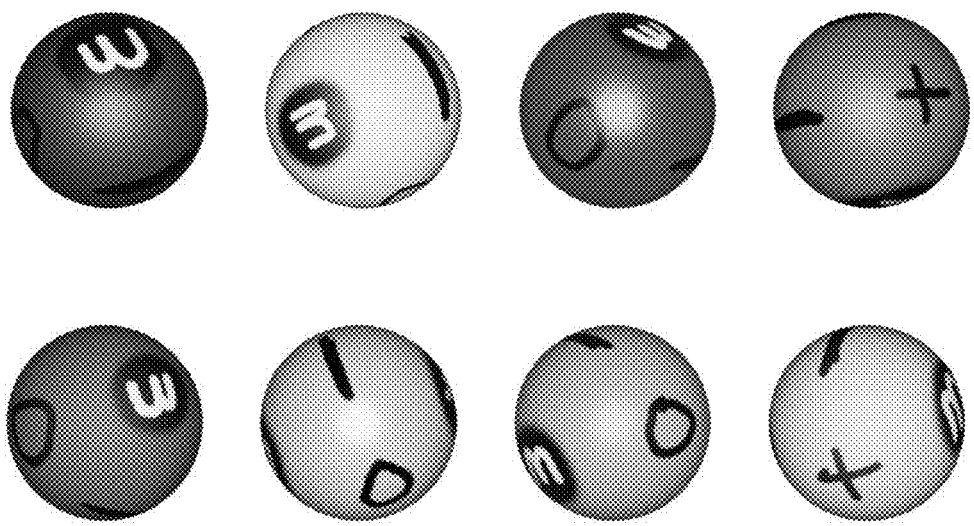
FIG. 8 shows an example of a sequence of images in the generation of images of a completely symmetrical object (a sphere) with differentiating graphical characteristics on its surface for training and testing a machine learning module. Although the spheres are shown in grayscale, the images of the spheres used in the training comprise different colors for generating each image so that the results are independent of the color of the sphere.

FIG. 8 shows an example of a sequence of images of a sphere which are generated for training and testing a machine learning module ($A_i$).

In this example, the sphere is an object having the same shape regardless of the perspective from which it is viewed. The machine learning module ($A_i$) is therefore trained in these cases to detect the surface appearance of the physical object (O) since the shape of the object (O) does not provide any information about the orientation thereof.

Like in some preceding examples, in this example a single camera will first be used to estimate the position of the sphere. According to this particular example, the orientation of the physical object (O) determined by at least one machine learning module ($A_i$) is a vector of rotation in a quaternion format.

According to this example, the machine learning module ($A_i$) comprises a neural network which is trained to determine the estimated orientation of the physical object (O) from the camera.

To train the network of the machine learning module ($A_i$), quaternions defining different possible orientations of the object (O) will be randomly generated and images of the object (O) corresponding to the orientations will then be generated. Each of the generated images is therefore established as an input of the machine learning module ($A_i$) and the machine learning module ($A_i$) is configured, given an image, for returning as an output the orientation corresponding thereto and being, for example, in the form of a 4-dimensional vector corresponding to the quaternion.

According to this example, the images shown in FIG. 8 are generated to train the machine learning module ($A_i$), six of them being used to train the network, one of them used as validation, and the last image used for testing, obtaining the following results.

After training the network and estimating the orientation of the sphere in the last image, the following angle-related errors between the estimate and the actual value of the orientation of the object in the last image are obtained:

Mean=9.53°
Median=8.24°

Figure 9A:
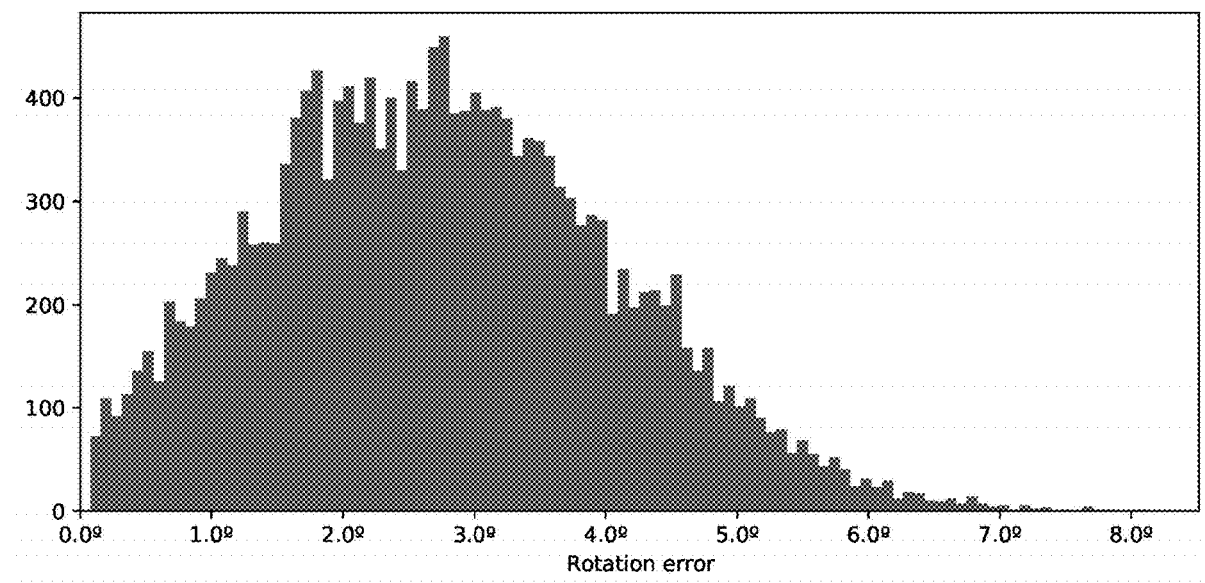
FIGS. 9A and 9B show the graphs of the distribution of the error of the angle estimated in the preceding example using a camera.
Figure 9B:
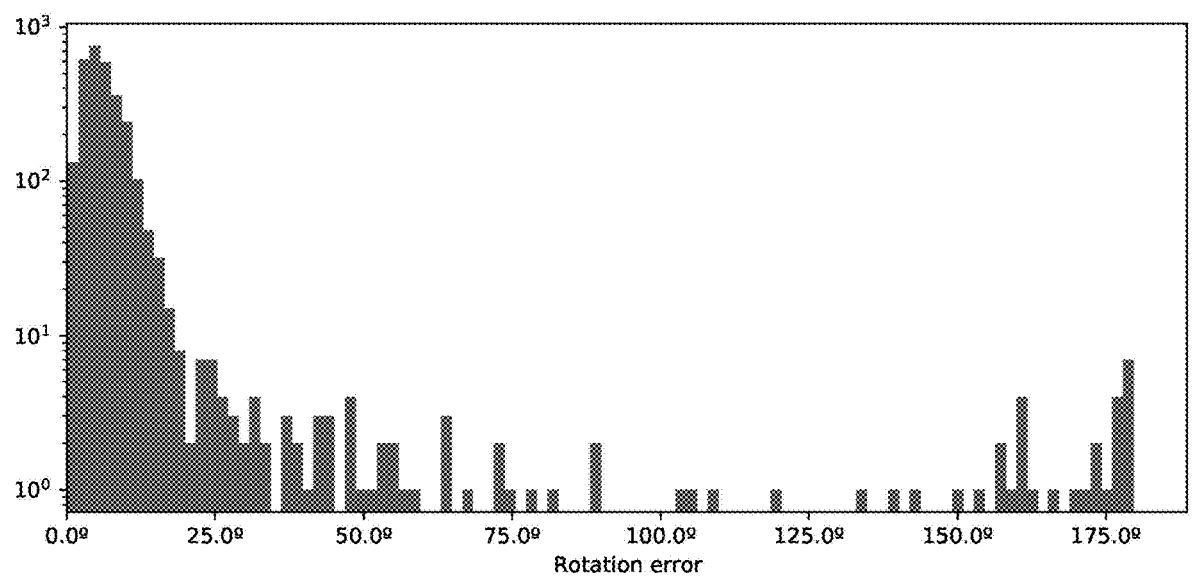

FIGS. 9A and 9B show the obtained distribution of the error of the angle. FIG. 9A shows the distribution of the best anticipated error, while FIG. 9B shows the distribution obtained from the test performed with the last image. Due to the use of a single camera to determine the orientation, the camera may present a significant error in the estimate. By using a single camera, the obtained error corresponds to the error committed by the neural network (the specific machine learning module used), while according to the invention, by combining the information of several cameras, the error of the estimated orientation can be drastically reduced. This is the case seen in the following figures.

Figure 10:
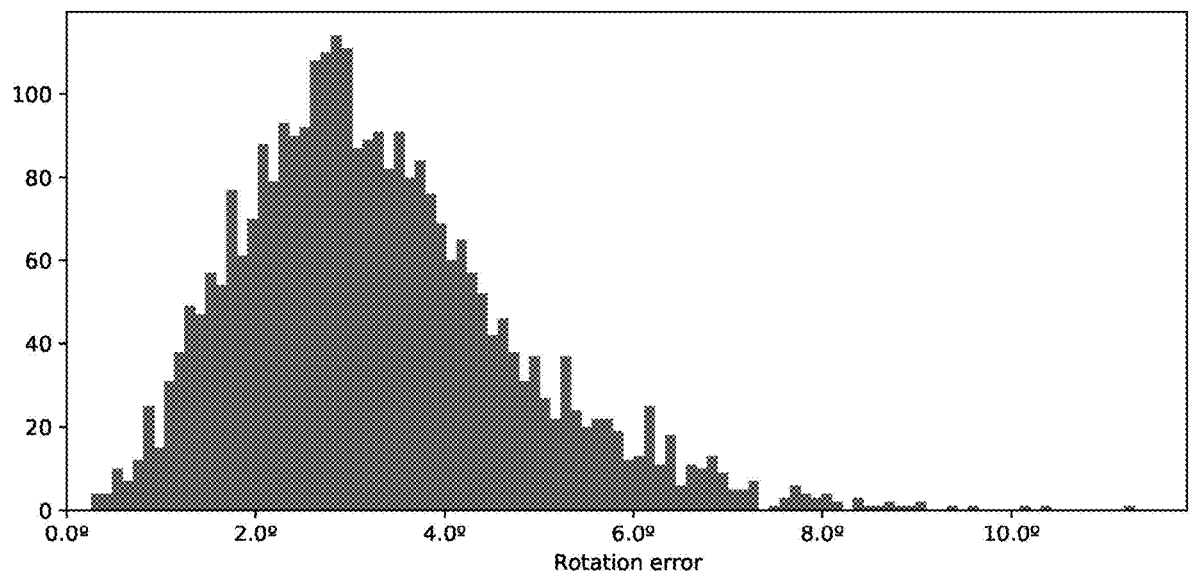
FIG. 10 shows the graph of the distribution of the error of the estimator trained and evaluated with the object of the preceding example using six cameras.
Figure 11:
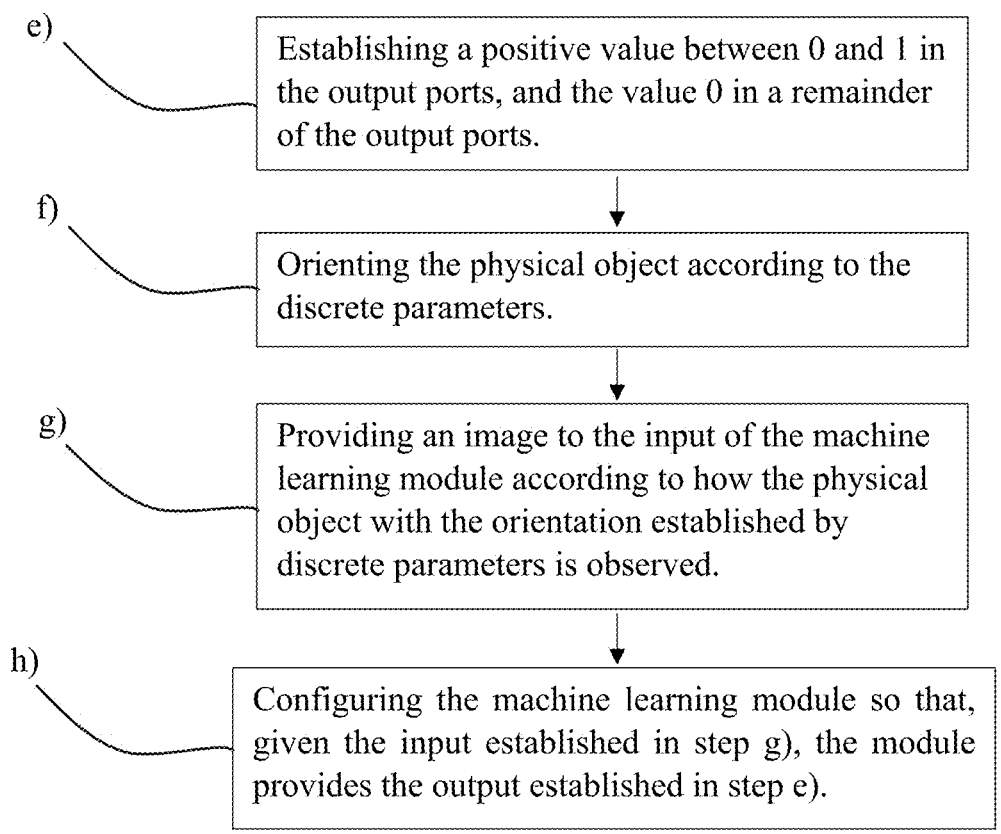
FIG. 11 shows a flow diagram of a method for determining the orientation of a physical object.

FIG. 10 shows the graph of the distribution of the error of the angle obtained after estimating the orientation of a sphere with six cameras based on the training performed in the preceding example.

According to this example, the network of a machine learning module ($A_i$) is trained as specified above and replicated so that there is one machine learning module ($A_i$) for each camera ($C_i$).

To determine the orientation of the physical object (O) in a global and specific manner, a global reference pertaining to all the cameras must be established. According to this particular example, the orientation of the camera 1 as a reference system is established such that the need to transform the reference system for the measurements acquired in this camera is thereby prevented.

According to this example, the central processing unit (U) has information about the orientation and position of each of the cameras with respect to this specific global reference. In this manner, when the central processing unit (U) receives the estimated local orientations, it transforms each of the local orientations of each camera so that it is expressed in the global reference system of all the cameras ($C_i$). All the estimated orientations therefore have the same reference system, allowing them to be combined for determining the global orientation of the object (O) in a precise manner.

The mean error of the angle between the actual orientation and the estimated orientation determined by each of the views between the estimate and the actual orientation of the object in this test example is as follows:

Mean error of camera 1=10.38°
Mean error of camera 2=8.91°
Mean error of camera 3=10.01°
Mean error of camera 4=8.94°
Mean error of camera 5=10.24°
Mean error of camera 6=8.71°

To reduce this error in the estimate and to determine the orientation of the object (O) in a precise manner, information about the estimates of orientations for each camera calculated in the computing systems ($D_j$) is sent to the central processing unit (U) in which the estimates are combined to determine the global orientation of the object (O).

According to this example, information about the orientation is represented by means of quaternions, so the combination of the information is performed by means of the mean of the angles suggested by the estimated quaternions. To compute the mean of the quaternions, the sign of those quaternions with a negative sign must be changed in order to be able to compute the mean.

After combining the estimates and eliminating anomalous quaternions like in the preceding example relating to the die, the following errors of the angle between the combination of estimates and the actual value of the orientation of the object in the test image are obtained:

Mean=4.39°
Median=4.13°

As can be seen, with the use of a larger number of cameras and the elimination of anomalous quaternions, a more precise estimate of the orientation is obtained, something that none of the cameras could achieve regardless of their orientation.

FIG. 10 shows the graph of the distribution of the error of the angle obtained as a result of the combination of the local estimates of the cameras, the angle of the error being the angle between the estimated orientation and the actual orientation of the physical object (O).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining an orientation of a physical object in space, wherein the method uses:
   a plurality of N cameras, and
   a plurality of M distributed computing systems, each computing system in communication with at least one of the plurality of cameras, wherein M≤N; and each camera being in communication with at least one computing system of the plurality of computing systems;
   wherein the method comprises the following steps:
   a) positioning the physical object in a common capture region and instructing the plurality of cameras to capture an image of the physical object at the same time instant;
   b) for each camera, providing the image as an input to a machine learning module associated with the camera, and determining an estimated orientation from the camera, wherein the machine learning module is trained to determine the orientation of the physical object;
   c) transmitting from the plurality of computing systems to a central processing unit at least information determined by the machine learning modules about the orientation of the physical object viewed from a plurality of cameras; and d) calculating, in the central processing unit, an angle determining the orientation of the physical object with respect to a global reference based on a combination of the different orientations estimated from the plurality of cameras, wherein the orientation of the physical object determined by at least one of the machine learning modules is a probability density function for each parameter determining the orientation, wherein at least one of the machine learning modules is adapted for providing in an output of the machine learning module, for each parameter determining the orientation of the physical object, a plurality of K output ports discretizing a range of values of the parameter;

during training, for each discrete value of each parameter determining the orientation of the physical object, the following steps are carried out:

e) establishing, in the plurality of K output ports corresponding to the set of the discrete values of parameter which determine the orientation of the physical object, a positive value between 0 and 1 in a portion of the plurality of K output ports, and the value 0 in a remainder of the plurality of K output ports;

f) orienting the physical object according to the discrete parameters;

g) providing an image to the input of the machine learning module according to how the physical object with the orientation established by discrete parameters is observed; and h) configuring the machine learning module so that, given the input established in step g), the machine learning module provides the output established in step e).

2. The method according to claim 1, wherein the orientation of the physical object determined by at least one machine learning module is an orientation vector or azimuth and elevation angles and a third angle of rotation about an axis oriented by the preceding angles, a quaternion, or a rotation matrix, any of them being associated with a reference of the physical object.

3. The method according to claim 1,
wherein the plurality of machine learning modules have the same training to determine the orientation of the physical object;
wherein the central processing unit has information about the orientation of each of the cameras with respect to a global reference; and
wherein the central processing unit, before calculating an angle determining the global orientation of the physical object, transforms the estimated orientation from each camera from a local reference system of the camera to a global reference system.

4. The method according to claim 1,
wherein each machine learning module has a different training to determine the orientation of the physical object, the machine learning module being trained to determine the orientation of the physical object viewed from the associated camera with respect to the global reference; and
the central processing unit determines the orientation of the physical object by weighting the plurality of orientation estimates transmitted from each machine learning module.

5. The method according to claim 1, wherein in step e), given an orientation of the physical object and the corresponding value of parameter, the values of the output ports with a positive value or with the value 0 are determined according to the following sub-steps:

determining a Gaussian function having, as a mean, the value of parameter, and a pre-established variance;
generating a histogram of the Gaussian function with the points of discretization of parameter and assigning the value of the corresponding histogram to each output port.

6. The method according to claim 5, wherein before generating the histogram, an upsampling is carried out on the discrete values of the Gaussian function in the discretization of parameter and the values of the histogram are calculated in the points of discretization of parameter taking the values interpolated on the upsampling values.

7. The method according to claim 6, wherein the interpolation is by means of splines.

8. The method according to claim 1, wherein the image of step g) is generated according to the following steps:
generating a numerical model representing a shape of the physical object;
orienting the numerical model according to the orientation established by the discrete parameters.

9. The method according to claim 1, wherein the central processing unit, before calculating the angle determining the global orientation of the physical object, eliminates anomalous estimates of the plurality of orientation estimates transmitted from each machine learning module.

10. The method according to claim 1, wherein at least one machine learning module comprises a neural network configured for determining the estimated orientation of the physical object from the camera associated with said machine learning module.

11. The method according to claim 1, wherein the machine learning module is furthermore additionally trained to determine a movement of the physical object and comprises outputs with parameters determining said movement.

12. The method according to claim 1, wherein the machine learning module is furthermore trained to detect a surface appearance of the physical object.

13. The method according to claim 8,
wherein the machine learning module is furthermore trained to detect the surface appearance of the physical object, and
wherein a numerical model which, in addition to shape, represents a surface appearance of the physical object is generated.

14. A device for determining an orientation of a physical object in space comprising:
a plurality of N cameras, and
a plurality of M distributed computing systems, each computing system in communication with at least one of the plurality of cameras, wherein M≤N; and each camera being in communication with at least one computing system of the plurality of computing systems;
wherein a central processing unit, the plurality of distributed computing systems, and machine learning modules are adapted for carrying out steps a) to h) according to claim 1.

15. A non-transitory computer readable medium storing a computer program product comprising program code portions which, when executed on a computer system or one or more computing devices, cause the computer system of the one or more computing devices, to carry out a method according to steps a) to h) according to claim 1.

* * * * *